United States Patent
Spieth et al.

(10) Patent No.: US 9,758,032 B2
(45) Date of Patent: Sep. 12, 2017

(54) EXHAUST MUFFLER FOR TRANSVERSE INSTALLATION IN A VEHICLE

(71) Applicant: Eberspächer Exhaust Technology GmbH & Co. KG, Neunkirchen (DE)

(72) Inventors: Arnulf Spieth, Hochdorf (DE); Daniel Mesghena, Ostfildern (DE); Joachim Müller, Metzingen (DE); Mathias Rothfuβ, Waiblingen (DE); Michael Weiβ, Plüdershausen (DE)

(73) Assignee: EBERSPÄCHER EXHAUST TECHNOLOGY GMBH & CO. KG, Neunkirchen (DE)

( * ) Notice: Subject to any disclaimer, the term of this patent is extended or adjusted under 35 U.S.C. 154(b) by 0 days.

(21) Appl. No.: 15/166,662

(22) Filed: May 27, 2016

(65) Prior Publication Data

US 2016/0347168 A1 Dec. 1, 2016

(30) Foreign Application Priority Data

May 29, 2015 (DE) .................. 10 2015 108 495

(51) Int. Cl.
- *F01N 1/08* (2006.01)
- *B60K 13/04* (2006.01)
- *F01N 13/18* (2010.01)

(52) U.S. Cl.
CPC .............. *B60K 13/04* (2013.01); *F01N 1/08* (2013.01); *F01N 13/18* (2013.01); *F01N 13/1805* (2013.01); *F01N 13/1811* (2013.01); *F01N 13/1822* (2013.01); *F01N 13/1838* (2013.01); *F01N 1/083* (2013.01); *F01N 1/089* (2013.01); *F01N 2260/00* (2013.01); *F01N 2470/10* (2013.01); *F01N 2470/18* (2013.01); *F01N 2490/16* (2013.01)

(58) Field of Classification Search
CPC ........ F01N 1/08; F01N 13/18; F01N 13/1805; F01N 13/1811; F01N 13/1822; F01N 13/1838; F01N 1/089; F01N 1/083
USPC ........................................ 181/227, 228, 282
See application file for complete search history.

(56) References Cited

U.S. PATENT DOCUMENTS

| 2,046,193 | A | | 6/1936 | Spicer |
| 2,958,389 | A | | 11/1960 | Deremer |
| 3,289,786 | A | | 12/1966 | Powers |
| 3,543,878 | A | * | 12/1970 | Hamilton ............. F01N 1/02 181/228 |

(Continued)

FOREIGN PATENT DOCUMENTS

| DE | 44 17 653 A1 | 11/1995 |
| DE | 10 2013 214 612 A1 | 1/2015 |

(Continued)

*Primary Examiner* — Forrest M Phillips
(74) *Attorney, Agent, or Firm* — McGlew and Tuttle, P.C.

(57) ABSTRACT

An exhaust muffler for transverse installation in a vehicle includes a muffler housing (26) elongated in the direction of a housing longitudinal axis (G) with a housing jacket (28) and two front walls (30, 32). The two front walls (30, 32) are arranged at spaced locations from one another and define an interior (34) of the muffler with the housing jacket (28). At least one inlet pipe (36) leads into the interior (34) of the muffler and at least one outlet pipe (20) leads out of the interior (34) of the muffler. At least one front wall (30, 32) has at least one predetermined deformation area (50, 52).

22 Claims, 4 Drawing Sheets

(56) References Cited

U.S. PATENT DOCUMENTS

| | | | | |
|---|---|---|---|---|
| 4,673,058 | A | * | 6/1987 | Roberts .................... F01N 1/02 |
| | | | | 181/256 |
| 6,427,802 | B1 | * | 8/2002 | Yokoi ...................... F01N 1/02 |
| | | | | 181/265 |
| 7,690,479 | B2 | * | 4/2010 | Tanaka .................... F01N 1/02 |
| | | | | 181/238 |
| 8,393,433 | B2 | | 3/2013 | Inoue et al. |
| 8,770,342 | B2 | * | 7/2014 | Wirth ..................... F01N 1/026 |
| | | | | 181/268 |
| 2001/0018995 | A1 | * | 9/2001 | Uegane ................. B60K 13/04 |
| | | | | 181/275 |
| 2007/0240934 | A1 | | 10/2007 | Van de Flier et al. |
| 2012/0292128 | A1 | * | 11/2012 | Keesser ................. F01N 1/023 |
| | | | | 181/227 |

FOREIGN PATENT DOCUMENTS

| | | |
|---|---|---|
| GB | 2 536 956 A | 10/2016 |
| JP | S60-57716 U | 4/1985 |
| JP | S61-169611 A | 7/1986 |
| JP | 2001-123828 A | 5/2001 |
| JP | 2006-327488 A | 12/2006 |
| JP | 2007-224778 A | 9/2007 |
| JP | 2007-309134 A | 11/2007 |
| JP | 2009-220738 A | 10/2009 |
| JP | 2012-166612 A | 9/2012 |
| JP | 2013-108367 A | 6/2013 |
| JP | 2013-248973 A | 12/2013 |
| JP | 2016 114033 | 6/2016 |
| WO | 2006/126388 A1 | 11/2006 |
| WO | 2010/149723 A1 | 12/2010 |

\* cited by examiner

Fig. 6

# EXHAUST MUFFLER FOR TRANSVERSE INSTALLATION IN A VEHICLE

CROSS REFERENCE TO RELATED APPLICATIONS

This application claims the benefit of priority under 35 U.S.C. §119 of German Patent Application 10 2015 108 495.3 filed May 29, 2015, the entire contents of which are incorporated herein by reference.

FIELD OF THE INVENTION

The present invention pertains to an exhaust muffler for transverse installation in a vehicle, comprising a muffler housing elongated in the direction of a longitudinal axis of the housing with a housing jacket and two front walls, which are arranged at spaced locations from one another in the direction of the longitudinal axis of the housing and define an interior of the muffler with the housing jacket, wherein at least one inlet pipe leads into the interior of the muffler and at least one outlet pipe leads out of the interior of the muffler.

BACKGROUND OF THE INVENTION

Such an exhaust muffler is known from DE 10 2013 214 612 A1. Partitions are arranged in the interior of the muffler in this prior-art muffler to be installed in a transverse direction of the vehicle with a longitudinal axis of the housing, and pipe sections pass through said partitions and thus make possible an acoustic connection and an exhaust gas flow connection between volume areas of the interior of the muffler, which said volume areas are separated from one another by these partitions. The partitions are configured such that if the introduction of force into the muffler acts in the longitudinal direction of the vehicle, as this may happen, for example, in case of a rear impact of another vehicle, the muffler is weak in terms of deformation in the direction in which the force is introduced, i.e., essentially in the longitudinal direction of the vehicle.

SUMMARY OF THE INVENTION

An object of the present invention is to provide an exhaust muffler for transverse installation in a vehicle, in which a deformability of the exhaust muffler, which contributes to an energy dissipation, is guaranteed especially in case of the introduction of a force in the longitudinal direction of the vehicle.

This object is accomplished according to the present invention by an exhaust muffler for transverse installation in a vehicle, comprising a muffler housing elongated in a longitudinal direction of the housing with a housing jacket and two front walls, which are arranged at spaced locations from one another in the direction of the longitudinal axis of the housing and define an interior of the muffler, wherein at least one inlet pipe leads into the interior of the muffler and at least one outlet pipe leads out of the interior of the muffler.

Provisions are made, furthermore, for at least one front wall to have at least one predetermined deformation area.

While components provided in the interior of the muffler housing, especially partitions, are made such that they are weak in terms of deformation in the exhaust muffler known from the state of the art, it is ensured in the exhaust muffler according to the present invention by providing at least one predetermined deformation area in at least one front wall and preferably in both front walls that even the muffler housing relatively readily undergoes deformation per se when force is introduced and thus it absorbs a substantial portion of the energy introduced into this. This diminishes the risk of the exhaust muffler being displaced and deformed in a vehicle, for example, in case of a rear impact, that it will collide with other system areas of a vehicle which are present in the area of the exhaust muffler, for example, with a fuel tank.

At least one predetermined deformation area may comprise at least one wall area that does not extend at right angles to the longitudinal axis of the housing, which causes that such a wall area is also positioned at an angle to the longitudinal axis of the vehicle and thus to the direction in which the force is introduced in case of a rear impact if the longitudinal axis of the housing is oriented in the transverse direction of the vehicle. For example, such a wall area may have an arch-like (arch-shaped), wave-like (wave-shaped), sickle-like (sickle-shaped) or Z-like (Z-shaped) configuration. Combinations of such shapes, which contribute to a comparatively easy deformability of such a wall area or of a front wall configured therewith, are also possible.

According to another aspect of the present invention, which is advantageous in itself, but may be combined especially with the above-described configuration aspect, it is proposed that an outlet pipe pass through at least one partition arranged in the interior of the muffler and be supported by means of at least one support member positioned at an angle in relation to the longitudinal axis of the housing in relation to at least one partition, and/or that at least one partition be supported in relation to the housing jacket of a partition tilting formation.

By supporting an outlet pipe in relation to a partition via a support member positioned at an angle in relation to the longitudinal axis of the housing, a force is introduced into a partition, which supports the deformation of the partition, in case of a stress of the outlet pipe in the longitudinal axis of the vehicle, i.e., essentially at right angles to the longitudinal axis of the muffler housing, even if the partition itself is not configured as a formations guaranteeing an easy deformation of said partition, as it is known, for example, from the state of the art. Provisions may be made in an alternative or additional configuration created at such a partition for this to be tilted in its entirety in relation to the muffler housing when force is introduced through the partition tilting formation, which contributes to a reduction of the overall rigidity of the muffler housing or to an improved energy dissipation.

The exhaust muffler may be configured such that the outlet pipe passes through the at least one partition with an outlet pipe area extending essentially parallel to the longitudinal axis of the housing, or/and that the partition tilting formation comprises at least and preferably a plurality of partition support surface areas positioned at an angle in relation to the longitudinal axis of the housing at the housing jacket.

According to another, independently advantageous aspect, which can, however, be combined with the above-described aspects, it is proposed that at least one inlet pipe or/and at least one outlet pipe or/and at least one intermediate pipe be configured with a cross-sectional profile flattened in a flattening direction, or/and that at least one outlet pipe or/and at least one intermediate pipe be offset in relation to one another essentially transversely to the longitudinal axis of the housing in a first offset direction extending essentially at right angles to the longitudinal axis of the housing and in a second offset direction that is essentially at right angles to the first offset direction. The consequence of the configuration of an inlet pipe and of an outlet pipe in a flattening direction is that when force is introduced in this flattening direction, such a pipe can be deformed markedly more easily than a pipe with a circular cross-sectional profile, which supports the easier deformability of the exhaust muffle in its entirety. The offset of an inlet pipe in relation to an outlet pipe in such a way that these are not arranged immediately following each other in a direction in which the force is introduced also supports the easy deformability and hence the energy dissipation in the exhaust muffler in case of an impact.

According to another aspect of the present invention, which may also be combined with the above-described aspects, it is proposed that the housing jacket be configured with a cross-sectional profile flattened in a flattening direction, or/and that the housing jacket comprise essentially planar side walls, which can be positioned essentially at right angles to a longitudinal direction of the vehicle.

The flattening of the housing jacket also causes the housing jacket to be able to be relatively easily deformed when force is introduced in the flattening direction, so that the overall rigidity of the exhaust muffler is reduced and increased energy dissipation is achieved during the deformation of the exhaust muffler. The configuration of the housing jacket with essentially planar, i.e., essentially uncurved side walls, which are positioned at right angles to the longitudinal direction of the vehicle, i.e., are extended essentially in the transverse direction of the vehicle and in the vertical direction of the vehicle, guarantees a comparatively easy deformability of the muffler housing or of the housing jacket thereof in case force is introduced in the longitudinal direction of the vehicle.

Since it can be assumed, in general, that force will be introduced essentially in the longitudinal direction of the vehicle in case of a rear impact if the exhaust muffler is arranged in the rear area of a vehicle, and the longitudinal axis of the housing of the exhaust muffler is oriented in the transverse direction of the vehicle, it is proposed that the flattening direction or/and the first offset direction correspond essentially to a longitudinal direction of the vehicle, or/and that the second offset direction correspond essentially to a vertical direction of the vehicle.

The flattened cross-sectional profile may be a circular cross-sectional profile, preferably oval or elliptical, or it may be an essentially rectangular cross-sectional profile.

According to another aspect of the present invention, which can also be combined with the above-described configuration aspects, it is proposed that at least one inlet pipe or/and at least one outlet pipe have at least one predetermined deformation area. The provision of one or more predetermined deformation areas on the inlet and outlet pipes cause that a deformation can be achieved relatively easily in the area of such pipes when force is introduced, which contributes to the energy dissipation and diminishes the risk that forces are transmitted to other system areas of an exhaust system via such pipes.

Provisions may be made, for example, for at least one predetermined deformation area to comprise a longitudinal area having a wave-like (shaped) configuration or bellows configuration or/and a longitudinal area configured with slots or/and a longitudinal area configured with an indentation or a bulge or/and a longitudinal area configured with a flattened cross-sectional profile or/and a longitudinal area extending positioned at an angle in relation to a longitudinal direction of the vehicle.

An especially efficient utilization of the energy dissipation capacity provided in such a predetermined deformation area can be achieved by at least one outlet pipe comprising a longitudinal area extending essentially in the direction of the longitudinal direction of the housing and a transition area to a longitudinal area extending essentially at right angles to the longitudinal axis of the housing, and by at least one predetermined deformation area being provided in the transition area.

According to another aspect of the present invention, which is especially advantageous in itself, but may nevertheless also be combined with the above-described aspects, it is proposed that at least one outlet pipe comprise a longitudinal area extending essentially at right angles to the longitudinal axis of the housing outside the muffler housing, and that a ratio of a cross-sectional dimension, preferably diameter, of this longitudinal area to a distance of this longitudinal area from a front wall through which the outlet pipe passes be in the range of 0.1 to 0.2.

A comparatively large operating arm is guaranteed in the area of an outlet pipe in case of such a configuration of the exhaust muffler, so that even comparatively weak forces can cause a deformation in the exhaust muffler and hence energy dissipation even in case of comparatively weak force because of the large operating level in order to thus diminish the risk that the exhaust muffler will be displaced in its entirety in a vehicle.

According to another aspect of the present invention, which can also be combined with the above-described aspects, provisions may be made for at least one inlet pipe or/and at least one outlet pipe or/and at least one intermediate pipe to pass through at least one partition provided in the interior of the muffler in the area of a pipe passage opening, and for providing at least one opening, through which no pipe passes, in the partition or/and for at least one pipe passage opening to have an opening cross-sectional area that is larger than a cross-sectional area of the pipe passing through this pipe passage opening.

By providing such openings or pipe passage openings, a weakening is achieved in the area of a partition, which leads to a comparatively easy deformability of a partition thus configured when force is introduced into a vehicle or into an exhaust muffler and thus to low rigidity of the exhaust muffler.

Provisions may be made in this connection, for example, for at least one opening or/and at least one pipe passage opening to have a circular opening cross-sectional geometry, preferably an oval or elliptical cross-sectional geometry. A further weakening of a partition, which supports easier deformability, can be achieved by at least one, preferably slot-like (slot) weakened area being provided in a partition starting from at least one opening or/and at least one pipe passage opening. Provisions may be made in this connection in particular, for a deformation strap being provided by at least two weakened areas.

According to another independent aspect of the present invention, which may nevertheless also be combined with the above-described embodiment variants, it is proposed that the muffler housing be supported or be able to be supported by means of at least one support member extending positioned at an angle in relation to the longitudinal axis of the housing in relation to a carrier structure. When force is introduced in the longitudinal direction of the vehicle, such a support member extending at an angle in relation to the longitudinal direction of the housing and thus also at an angle in relation to the longitudinal direction of the vehicle in case of a transversely installed exhaust muffler causes the force component, which is passed on in the direction of the muffler housing and which may also lead to a displacement of the exhaust muffler in the longitudinal direction of the vehicle, to be reduced.

To also support this effect by a comparatively easy deformability of the exhaust muffler, especially of the muffler housing thereof, it is proposed that at least one partition be provided in the interior of the housing and for a distance of the at least one partition from a support area of the at least one support member in relation to the muffler housing in the direction of the longitudinal axis of the housing to equal at least 50 mm.

The present invention pertains, furthermore, to a motor vehicle with an exhaust muffler configured according to the present invention, wherein the exhaust muffler is preferably arranged in a rear area of the motor vehicle with the longitudinal axis of the housing of the muffler housing being oriented essentially in a transverse direction of the vehicle.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
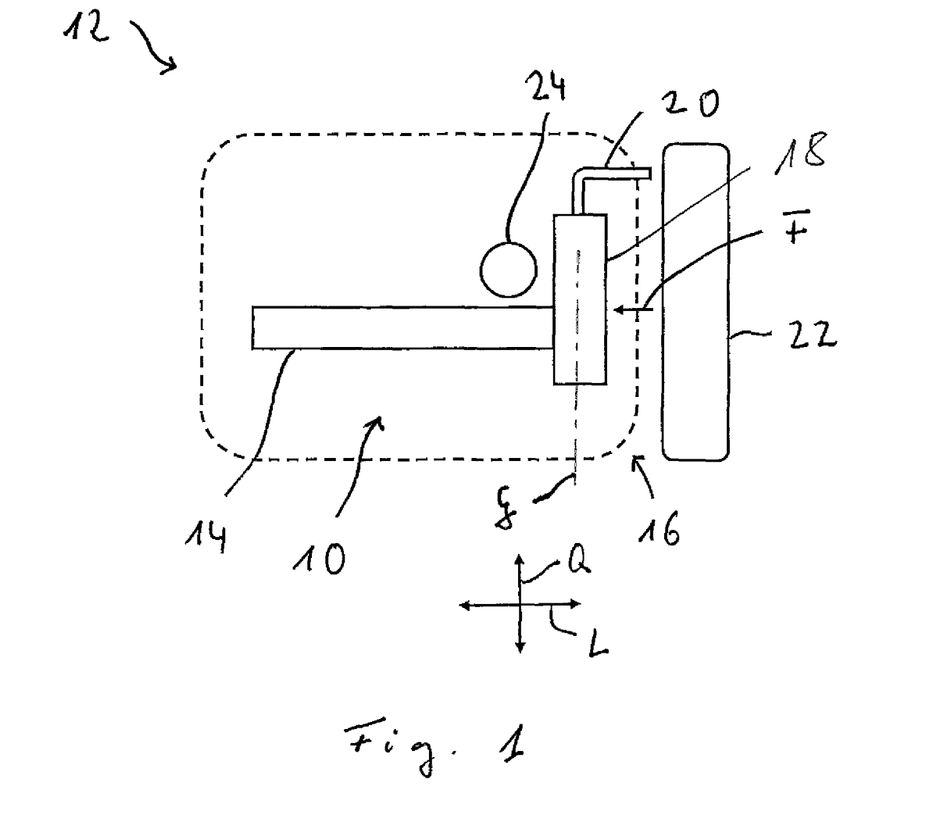
FIG. 1 is a schematic diagram of a vehicle equipped with a transversely installed exhaust muffler.

Referring to the drawings, A vehicle equipped with an exhaust gas duct system 10 is generally designated by 12 in FIG. 1. The exhaust gas duct system 10 comprises an exhaust gas line 14, which extends in a longitudinal direction L of the vehicle, for example, on a vehicle chassis or frame, and an exhaust muffler 18 installed such that it extends essentially in a transverse direction G of the vehicle with a housing longitudinal axis Q in a rear area 16 of the vehicle. The exhaust gases flowing through the exhaust muffler 18 leave the exhaust gas duct system through an outlet pipe 20 generally called a tail pipe.

In case of a rear impact on an obstacle 22, for example, another vehicle, a force F is, in general, introduced into the vehicle 12 or the rear area 16 thereof, which will have an essential component extending parallel to the longitudinal direction L of the vehicle. Due to such a force F introduced into the rear area 16, there is a risk that the exhaust gas duct system 10, especially the exhaust muffler 18 positioned in the rear area, will be displaced in the vehicle 12 and collide with other system areas of the vehicle, for example, with a tank 24. To avoid this, configuration aspects, which ensure easier deformability of the exhaust muffle 18 in the area thereof, will be described below, so that when a force F is introduced especially essentially in the direction of the longitudinal direction L of the vehicle, energy will be absorbed in the exhaust muffler 18 and the risk that said exhaust muffler will be excessively displaced in the vehicle 12 will be reduced.

Figure 2:
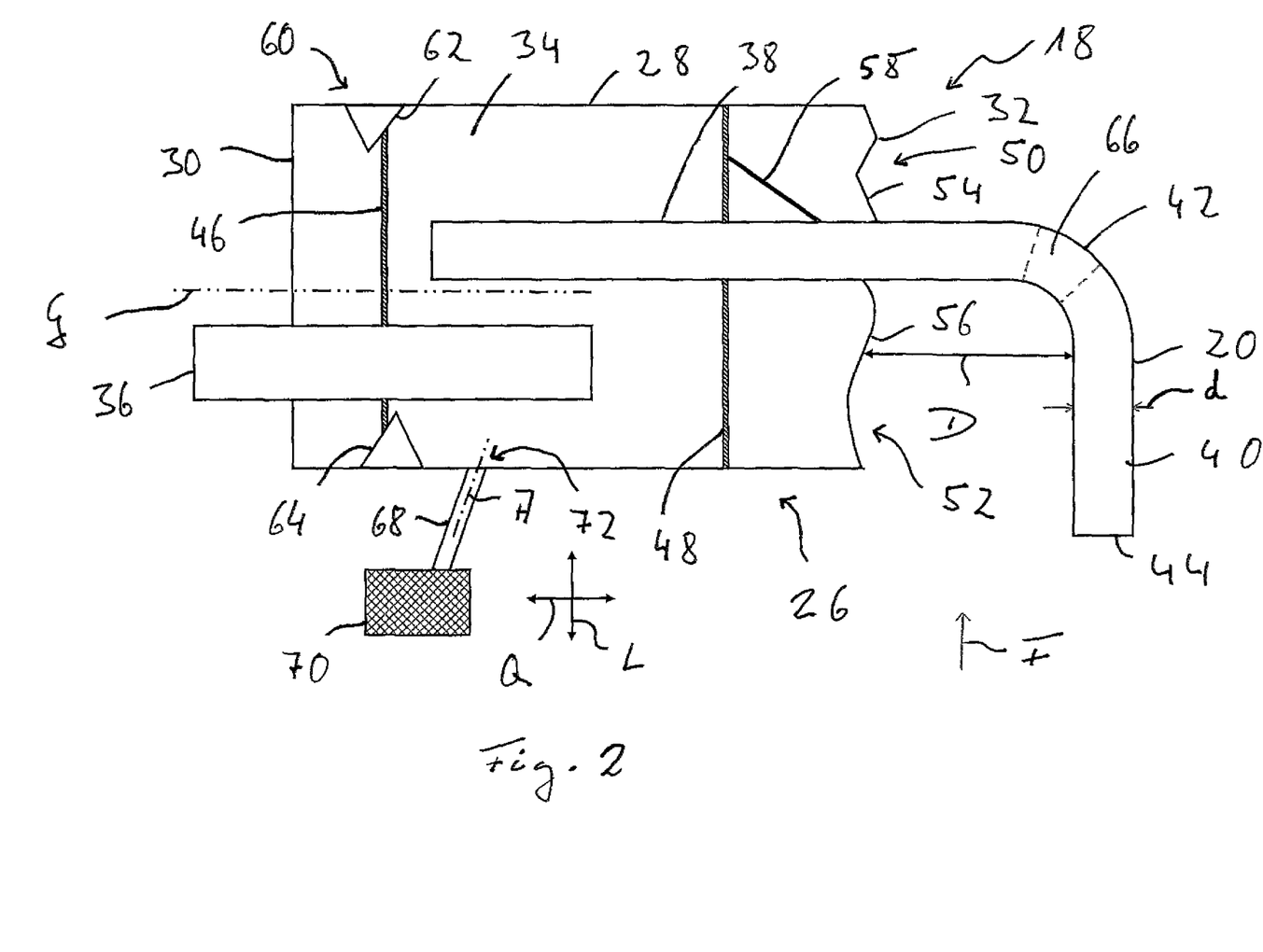
FIG. 2 is a schematic diagram of an exhaust muffler for transverse installation in a vehicle.

FIG. 2 shows a schematic top view of the exhaust muffler 18. The exhaust muffler 18 comprises a muffler housing 26 with a, for example, essentially cylindrically shaped housing jacket 28 elongated in the direction of a housing longitudinal axis G. At its two end areas located in the direction of the housing longitudinal axis G, the housing jacket 28 is permanently connected to respective front walls 30 and 32, for example, by a connection in substance. The housing jacket 28 encloses, together with the two front walls 30, 32, an interior 34 of the muffler.

An outlet or inlet pipe 36 leads, for example, through the front wall 30 into the interior 34 of the muffler. The outlet pipe 20, which can already be seen in FIG. 1, passes out of the interior 34 of the muffler through the front wall 32. In an alternative embodiment, the inlet pipe 36 may extend through the housing jacket 28 into the interior 34 of the muffler, so that the inlet pipe 36 with its longitudinal area leading into the interior 34 of the muffler is not located essentially such that it would extend essentially in the transverse direction Q of the vehicle, as is shown in FIG. 2, but it extends essentially in the longitudinal direction L of the vehicle.

The outlet pipe 20 comprises a longitudinal area 38, which extends essentially in the direction of the housing longitudinal axis G and which also passes through the front wall 32, and it comprises a longitudinal area 40 oriented essentially at right angles to the housing longitudinal axis L and thus also to the transverse direction Q of the vehicle. In a curved transition area 42, the longitudinal area 38 passes over into the longitudinal area 40. At the end 44 of the outlet pipe 20 located outside the interior 34 of the muffler, the combustion waste gases generated by an internal combustion engine can leave the exhaust gas duct system 10 to the surrounding area.

In the example being shown, two partitions 46, 48 are arranged in the interior 34 of the muffler in the direction of the housing longitudinal axis G. They are connected in their outer circumferential area to the housing jacket 28. With the inlet pipe 36 oriented in the direction of the housing longitudinal axis G, this inlet pipe may also pass through the partition 46 located closer to the front wall 30. In the example being shown, the longitudinal area 38 of the outlet pipe 20 passes not only through the front wall 32 but also through the partition 48. The interior 34 of the muffler is divided by the partitions 46, 48 into a plurality of volume areas, through some of which the exhaust gases can flow, and some of them are also provided or configured essentially for providing a muffler function. It should be noted that more than two partitions or possibly only a single partition may also be provided in the interior 34 of the muffler. Further, one or more intermediate pipes, which connect volume areas separated from one another by partitions, may be provided in the interior 34 of the muffler in case of a configuration in which the inlet pipe 36 passes through the housing jacket 28 into the interior 34 of the muffler. Such intermediate pipes may extend, for example, essentially in the direction of the housing longitudinal axis G, i.e., they may be arranged essentially parallel to the longitudinal area 38 of the outlet pipe 20.

All the above-described components of the exhaust muffler 18, i.e., the housing jacket 28, the front walls 30, 32, the inlet pipe 36, the outlet pipe 20 as well as the partitions 46, 48 are preferably made of a metallic material, especially sheet metal. Such material guarantees, in principle, deformability of the exhaust muffler due to a comparatively easy deformability of the exhaust muffler when a sufficiently strong force is introduced. To contribute to energy dissipation and thus to reduce the risk that the exhaust muffler 18 will be displaced in the vehicle 12 when a force F oriented essentially in the longitudinal direction L of the vehicle is introduced, for example, in case of a rear impact of another vehicle, the exhaust muffler is configured with different configuration aspects described in detail below. These may be embodied individually on an exhaust muffler, but they may also be provided in any combination with one another.

It is seen in FIG. 2 that the front wall 32, through which the outlet pipe 20 passes, is not arranged, unlike the front wall 30, oriented essentially at right angles to the housing longitudinal axis G in all areas, but it has one or more predetermined deformation areas 50, 52. The front wall 32 is configured in these predetermined deformation areas 50, 52 with one or more wall areas 54, 56, which are not oriented at right angles to the housing longitudinal axis G, but are positioned at an angle in relation to the housing longitudinal axis G. By providing such wall areas, comparatively easy deformability of the front wall 32 is achieved when a force F oriented essentially in the longitudinal direction L of the vehicle is introduced, so that the muffler housing 26 is less rigid per se. A corresponding configuration may, of course, also be provided in the area of the other front wall 30, regardless of whether or not the inlet pipe 36 extends through this front wall.

The predetermined deformation areas 50, 52 may have many different configurations. Thus, as in the case of the predetermined deformation area 50, they may be configured with a zigzag-shaped form or with a wave-like configuration, as in the area of the deformation area 52. The introduction of an arch, of beads or of a generally Z-shaped course or a bellows-like configuration of one or more predetermined deformation areas is also possible. These predetermined deformation areas 50, 52 may extend essentially over the entire front wall 32, but, as an alternative, they may also cover only areas thereof, for example, the area through which the outlet pipe 20 passes.

Another aspect contributing to the reduction of the overall rigidity of the exhaust muffler comprises the provision of a force-deflecting element 58 acting as a support member. This force-deflecting element 58, which is configured as a rod, bar or as a plate and is preferably made of a sheet metal, is oriented at an angle to the housing longitudinal axis G and is fixed, for example, by connection in substance or/and by positive-locking connection at the longitudinal area 38 of the outlet pipe 20, on the one hand, and at the partition 48, through which the longitudinal area 38 passes, on the other hand. When a force F is introduced in the longitudinal direction L of the vehicle, especially into the outlet pipe 20, for example, at the area 44 thereof, a tilting moment develops, also supported by the comparatively easy deformability of the front wall 32 due to the provision of one or more predetermined deformation areas 50, 52, at the outlet pipe 20, by which the outlet pipe is stressed for tilting about the connection area thereof to the partition 48 essentially in a plane defined by the longitudinal direction L of the vehicle and the transverse direction Q of the vehicle. In the view according to FIG. 2, this corresponds to a counterclockwise tilting. A force, which stresses the partition 48 and leads to a deformation thereof, is introduced into the partition 48 in the process by the force-deflecting element 58, which is positioned at an angle in relation to the housing longitudinal axis G. Even through the partition 48 has, for example, an essentially planar configuration and is arranged oriented, for example, essentially at right angles to the housing longitudinal axis G, a force introduced into the outlet pipe 20 in the longitudinal direction L of the vehicle can efficiently contribute to the deformation of the partition 48, so that the risk that the exhaust muffler 18 as a whole will be displaced to a substantial extent in the longitudinal direction L of the vehicle is reduced.

Another configuration that can be used in the area of the partitions 46, 48 to reduce the rigidity of the exhaust muffler 8 is shown in connection with the partition 46, but it may nevertheless also be used in addition to or as an alternative in connection with other partitions. The partition 46 is supported in relation to the muffler housing 26 via a partition tilting formation generally designated by 60. This may extend over the entire circumference or be limited to certain circumferential areas and comprise, for example, partition support surface areas 62, 64, which are provided, for example, by being formed in the housing jacket 28 or by the placement of separate components and are positioned at an angle in relation to the housing longitudinal axis G. The partition support areas 62, 64, which are located, for example, diametrically opposite to one another in relation to the housing longitudinal axis G, are arranged or positioned at an angle such that they are oriented opposite each other. When a force F is introduced into the housing jacket 28, these partition support surface areas 62, 64 generate a tilting moment based on their oblique position in relation to the housing longitudinal axis G and thus also based on their oblique position in relation to the direction of the force F, and this tilting moment tilts the entire partition 46 in the interior 34 of the muffler clockwise in the example being shown. This tilting causes the partition 46 to lose its property stiffening the housing jacket 28 at least partially and the housing jacket 28 is thus more easily deformable. In circumferential areas outside the partition support surface areas 62, 64, the partition 46 may adjoin or abut against the housing jacket 28 directly and be fixed at this, for example, by positive-locking connection or/and connection in substance.

According to another aspect of the present invention, the exhaust muffler 18 may be shaped such that a ratio of a cross-sectional dimension, for example, of the external diameter d, of the longitudinal area 40 to a distance D between the longitudinal area 40 of the outlet pipe 20, which said longitudinal area extends essentially in the longitudinal direction L of the vehicle, and the front wall 32 through which the outlet pipe 20 passes is in the range of 0.1 to 0.2. Such a configuration ensures that when a force F is introduced into the longitudinal area 40 of the outlet pipe 20, a sufficiently large lever and hence a sufficiently high torque is generated, which makes possible a deformation of the muffler housing 26 especially in the area of the front wall 32 or/and in the area of the partition 48. The front wall 32 may advantageously be described here as described above and the force-deflecting element 58 may be provided in order to also achieve easier deformability of the partition 48.

The easier deformability of the outlet pipe 20 may be supported in itself by this having one or a plurality of predetermined deformation areas 66. Such a predetermined deformation area 66 is provided in the example being shown, for example, in the transition area 42 between the two longitudinal areas 38, 40 extending essentially in a straight line. The predetermined deformation area 66 may be, for example, an area with a round cross-sectional geometry flattened in relation to a circular cross-sectional geometry, for example, with an elliptical or oval cross-sectional geometry. Easier deformability of the outlet pipe 20 and hence kinking of said outlet pipe is achieved when force is introduced, for example, in the transition area 42 due to this deviation from a comparatively rigid circular cross-sectional geometry. It should be noted that other configurations of such a predetermined deformation area may be embodied as well. For example, such a predetermined deformation area may comprise a bellows-like (bellows configuration), wave-like (wave-shaped) or zigzag-shaped configuration of a longitudinal section of the inlet pipe 20. The provision of a lateral bulge of the entire inlet pipe 20, laterally relative to the direction in which said pipe extends, is also possible. An essential advantage of providing such a predetermined deformation area 66 at the outlet pipe 20 is that reduced rigidity of the entire exhaust muffler 18 can be achieved without special configuration features of the muffler housing 26.

FIG. 2 shows, furthermore, a support member, which is generally designated by 68 and is made, for example, of a sheet metal or the like. The exhaust muffler 18 or the muffler housing 26 is carried or supported in relation to a symbolically represented carrier structure 70, for example, a vehicle frame, by means of this support member 68. A support member longitudinal axis A is oriented such that it is oriented at an angle in relation to the housing longitudinal axis G, i.e., especially it is not oriented such that it would extend at right angles. The two axes A and G do not necessarily have to be located in one plane. Due to this positioning at an angle in relation to the housing longitudinal axis G, the support member longitudinal axis A is also positioned at an angle in relation to the longitudinal direction L of the vehicle and the transverse direction Q of the vehicle. If a force is introduced into the rear area 16 of a vehicle 12, this causes the force component oriented in the direction of the longitudinal direction L of the vehicle to be reduced and thus also the force displacing the exhaust muffler 18 in this direction to be reduced correspondingly when force is correspondingly applied to the muffler housing 26 via the carrier structure 70 and the support member 68. It is advantageous in this connection if partitions 46, 48 provided in the interior 34 of the muffler have a sufficiently great distance in the direction of the housing longitudinal axis G from the area 72 in which the support member 68 is supported, for example, at the housing jacket 28. This distance should preferably be at least 50 mm. It is thus guaranteed that the force introduced into the muffler housing 26 is introduced into an area of the housing jacket 28 which is not stiffened by a partition provided in the interior 34 of the muffler.

It should be noted that the muffler housing 26 may, of course, be supported or carried by a plurality of such support members on a carrier structure which are positioned at an angle in relation to the housing longitudinal axis G. Such support members 68 may be arranged in the longitudinal direction L of the vehicle in front of the muffler housing 26 or behind the muffler housing. However, the effect of the reduced introduction of force can be utilized axially advantageously if such a support member 68 or a plurality of such support members 68 are positioned such that they lie behind the muffler housing 26.

Figure 3:
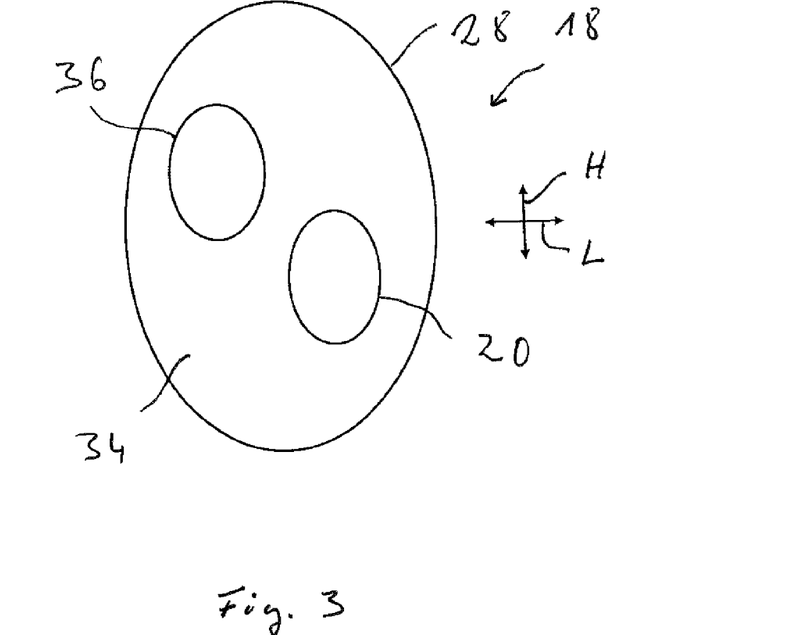
FIG. 3 is a schematic cross-sectional view of an exhaust muffler.

Another configuration aspect contributing to the reduction of the rigidity of the exhaust muffler 18 is shown in FIG. 3. FIG. 3 schematically shows the exhaust muffler 18 with its housing jacket 28 and two pipes extending in the interior 34 of the muffler, i.e., for example, the outlet pipe 20 and the inlet pipe 36 or an intermediate pipe extending in the interior 34 of the muffler instead of the inlet pipe 36 essentially parallel to the outlet pipe 20. The two pipes 20, 36 are flattened in a flattening direction corresponding to the longitudinal direction L of the vehicle in the example being shown, but nevertheless with a round cross-sectional profile. For example, the pipes 20, 36 may be provided with an elliptical or oval cross-sectional profile. The housing jacket 28 is correspondingly flattened in a flattening direction corresponding to the longitudinal direction L of the vehicle, for example, likewise with elliptical or oval, but basically round cross-sectional profile. The pipes 20, 36 as well as the housing jacket 28 thus have a greater length of extension in the direction of a vertical direction H of the vehicle, which is essentially at right angles to the longitudinal direction L of the vehicle and the transverse direction Q of the vehicle, than in the longitudinal direction L of the vehicle. When force is introduced into the longitudinal direction L of the vehicle, the pipes 20, 36 as well as the housing jacket 28 are comparatively easily deformable. It should be noted here that it is also possible to configure only one of the pipes or/and only the housing jacket 28 with such a flattened cross-sectional profile. However, as a general rule, the greater the radius of the circumferential areas that are located forward and backward in the longitudinal direction L of the vehicle, and the smaller the radius of the areas that are located such that they are oriented essentially in the vertical direction H of the vehicle, the lower is the rigidity of the component thus configured, i.e., for example, of the housing jacket 28 or the pipes 20, 36 in the longitudinal direction L of the vehicle.

According to another configuration aspect, which can be seen in FIG. 3, the pipes extending in the interior 34 of the muffler essentially parallel to one another and in the direction of the housing longitudinal axis G, i.e., for example, the outlet pipe 20 and the inlet pipe 36 or an intermediate pipe extending parallel to the outlet pipe 20 or/and to the inlet pipe 36 here, are offset in relation to one another in a first offset direction corresponding to the longitudinal direction L of the vehicle and in a second offset direction, which is at right angles thereto and corresponds essentially to the vertical direction H of the vehicle. When force is introduced in the direction of the longitudinal direction L of the vehicle, the pipes thus arranged are not located in one plane, so that the risk of a collision of such pipes, which collision compromises the deformability of the exhaust muffler 18, is reduced.

Figure 4:
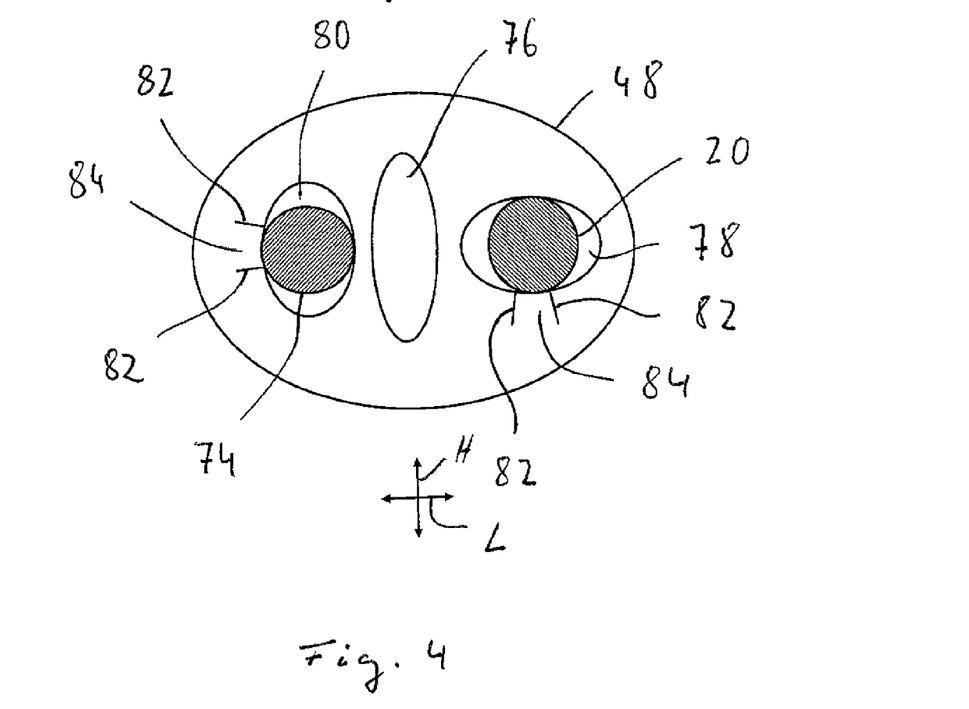
FIG. 4 is another schematic cross-sectional view of an exhaust muffler.

Further configuration aspects contributing to the reduction of the rigidity of the exhaust muffler are shown in FIG. 4. According to a first aspect which can be seen in FIG. 4, an opening 76 contributing, in general, to the weakening of said partition 48 may be provided in a partition, for example, the partition 48, through which pipes, for example, the inlet pipe 36, an intermediate pipe 74 and the outlet pipe 20, extend through, for example, in parallel. This opening 76 may have, for example, a round, for example, oval or elliptical cross-sectional geometry flattened in the direction of the vertical direction H of the vehicle. Under load in the longitudinal direction L of the vehicle, the partition 48 can thus collapse, as a result of which the overall rigidity of the exhaust muffler 18 is reduced. A plurality of such openings, through which no pipes pass, may, of course, also be provided in one or more of the partitions. Such openings generally contributing to the weakening of partitions may also be provided in partitions that are used only to separate volume areas of the interior 34 of the muffler from one another, but through which no pipes, i.e., for example, the inlet pipe 36, the outlet pipe 20 or an intermediate pipe 74 pass.

The partition 48 shown in FIG. 4 comprises, further, two passage openings 78, 80, through which extend, for example, the outlet pipe 20 and an intermediate pipe 74, but also the inlet pipe 36. It is seen that the pipes 20, 74 are configured with essentially circular cross-sectional geometry in the exemplary embodiment shown in FIG. 4, while the passage openings 78, 80, through which these pipes 20, 74 pass, have a flattened round, for example, oval or elliptical cross-sectional geometry. The passage openings 78, 80 have a larger cross-sectional area than the pipes 20, 74 which pass through these. This also leads to a weakening of the partition 48 per se and thus to easier deformability when a force is introduced in the longitudinal direction L of the vehicle.

As can, furthermore, be seen in FIG. 4, the passage openings 78 and 80, through which respective pipes pass, may be flattened or elongated such that they are oriented in different directions. The flattening in the longitudinal direction L of the vehicle, which can be seen in connection with the passage opening 80, is especially advantageous here, because this contributes to a marked weakening of the partition 48 when force is introduced in this direction.

An additional contribution can be made to the weakening of such a partition by providing a weakened area 82 provided, for example, in the form of a slot, a notch or a weakening of the material, for example, starting from the passage openings 78, 80 or at least one such passage opening. Two such weakened areas 82 are provided in the example being shown starting from the same passage opening 78, 80, so that a deformation strap 84 is formed between two such weakened areas 80, 82. The partition 48 is easily deformable in the area of such a deformation strap 84, especially also when tilting moments act on the respective pipes 20 and 74 and these tilt in relation to the partition 48. It is therefore especially advantageous if such a deformation strap adjoins a respective passage opening 78 and 80 in an area in which there also is a force-transmitting connection between a pipe passing through the respective passage opening and the partition.

Figure 5:
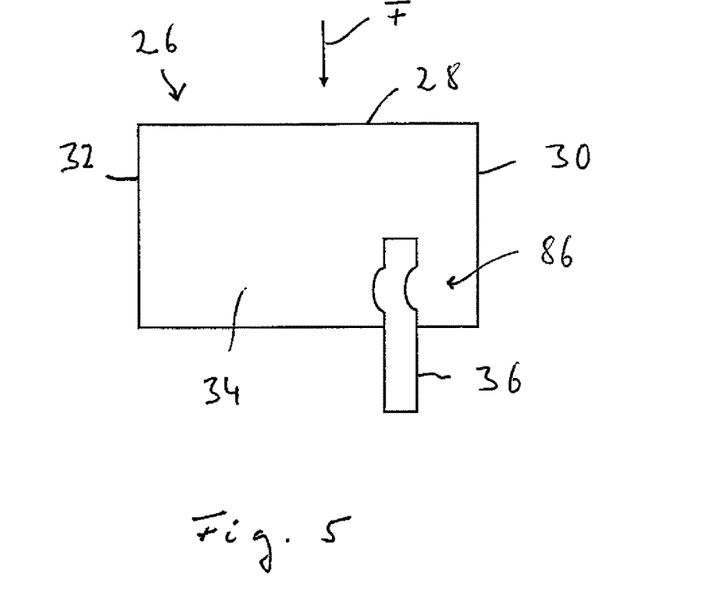
FIG. 5 is a schematic top view of an exhaust muffler.

Another exemplary embodiment of an exhaust muffler 18 is shown in a schematic view in FIG. 5. The muffler housing 26 with its housing jacket 28 oriented essentially in the transverse direction Q of the vehicle and with its two front walls 30, 32 is seen. In the example shown in FIG. 5, the inlet pipe 36 passes through the housing jacket 28, for example, such that it extends essentially in the longitudinal direction L of the vehicle, i.e., also the potential direction in which a force F is introduced. In order for the inlet pipe 36, which extends in this direction and is thus, in principle, comparatively rigid in this direction, to be also able to be deformed more easily when such a force F is introduced, this pipe may be configured with one or more predetermined deformation areas 86. Such a predetermined deformation area 86 may be formed by a bulge, an expansion of the cross section or a reduction of the cross section, a bellows configuration or a configuration with a plurality of openings and may be positioned within or outside the interior 34 of the muffler. A force F acting on the exhaust muffler 18 in the longitudinal direction L of the vehicle can thus lead to a comparatively easy deformation of the inlet pipe 36, so that at least some of the energy introduced into the exhaust muffler 18 can be dissipated in this way.

Figure 6:
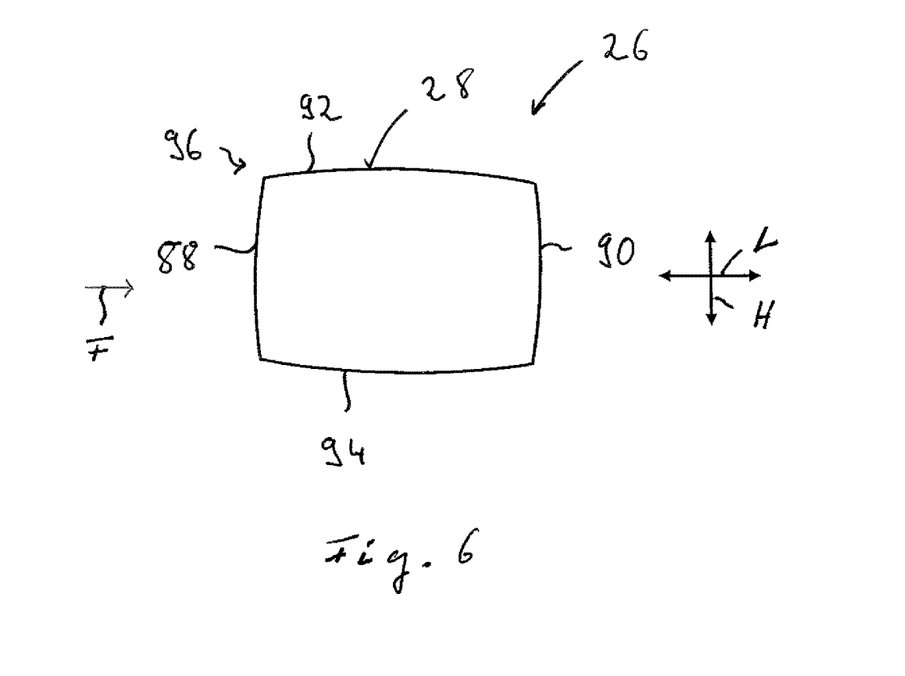
FIG. 6 is a schematic cross-sectional view of a muffler housing.

FIG. 6 shows a front view and cross-sectional view of the muffler housing 26 with the housing jacket 28 thereof. The housing jacket 28 has an essentially rectangular cross-sectional profile here. The housing jacket 28 is configured with two side walls 88, 90 positioned essentially at right angles in relation to the longitudinal direction L of the vehicle and with two side walls 92, 94 oriented essentially at right angles to the vertical direction H of the vehicle. These pass over into one another in respective corner areas 96. The housing jacket 28 may be made of sheet metal with its side walls 88, 90, 92, 94 extended in the direction of the longitudinal axis of the housing and in the vertical direction H of the vehicle and brought to the shape shown by shaping. As is illustrated in FIG. 6, the side walls 88, 90, 92, 94, which are, in principle, essentially planar, i.e., essentially uncurved, may be bulged slightly to the outside.

If a force F is introduced into a muffler housing 26 having such a configuration in the longitudinal direction L of the vehicle, for example, in the area of the side wall 88, this side wall can be deformed inwardly relatively easily because of the essentially planar configuration. Such a configuration is especially advantageous if punctiform loads are to be expected in the area of the side wall 88. The nevertheless flattened cross-sectional profile makes it possible to install such a muffler housing 26 in a space that is narrow above all in the vertical direction H of the vehicle.

It should finally be emphasized once again that the above-described configuration aspects contributing to the reduced rigidity of the exhaust muffler 18 or of the entire exhaust gas duct system 10 may be provided individually or in any desired combination. All these configuration aspects cause a considerable part of the energy introduced into the exhaust muffler or the exhaust gas duct system to lead to the deformation of components or areas of the exhaust muffler 10 when a force F or force component oriented essentially in the longitudinal direction L of the vehicle acts on the exhaust gas duct system 10 or the exhaust muffler 18, especially in case of a rear impact.

While specific embodiments of the invention have been shown and described in detail to illustrate the application of the principles of the invention, it will be understood that the invention may be embodied otherwise without departing from such principles.

What is claimed is:

1. An exhaust muffler for transverse installation in a vehicle, the exhaust muffler comprising:
   a muffler housing elongated in a direction of a housing longitudinal axis, the muffler housing comprising a housing jacket and two front walls, which are arranged at spaced locations from one another in the direction of the housing longitudinal axis and define an interior of the muffler with the housing jacket;
   at least one inlet pipe leading into the interior of the muffler; and
   at least one outlet pipe leading out of the interior of the muffler, the at least one inlet pipe or the at least one outlet pipe or both the at least one inlet pipe and the at least one outlet pipe and at least one intermediate pipe being configured with a cross-sectional profile flattened in a flattening direction, wherein the flattened cross-sectional profile is a round cross-sectional profile comprising an oval or elliptical cross-sectional profile or an essentially rectangular cross-sectional profile.

2. An exhaust muffler in accordance with claim 1, wherein the at least one predetermined deformation area comprises at least one wall area that is not at right angles to the housing longitudinal axis.

3. An exhaust muffler in accordance with claim 2, wherein the wall area has an arc-shaped, wave-shaped, bead-shaped or Z-shaped configuration.

4. An exhaust muffler in accordance with claim 1, further comprising at least one partition arranged in the interior of the muffler and supported by means of at least one support member positioned at an angle in relation to the housing longitudinal axis in relation to the at least one partition or the at least one partition is supported by a partition tilting formation in relation to the housing jacket or the at least one partition is supported by both at least one support member positioned at an angle in relation to the housing longitudinal axis in relation to the at least one partition and by the partition tilting formation in relation to the housing jacket, wherein the outlet pipe passes the at least one partition.

5. An exhaust muffler in accordance with claim 4, wherein the outlet pipe passes through the at least one partition with an outlet pipe area extending essentially parallel to the housing longitudinal axis, or the partition tilting formation comprises at least one partition support surface area positioned at an angle in relation to the housing longitudinal axis at the housing jacket or both the outlet pipe passes through the at least one partition with an outlet pipe area extending essentially parallel to the housing longitudinal axis, or the partition tilting formation comprises at least one partition support surface area positioned at an angle in relation to the housing longitudinal axis at the housing jacket.

6. An exhaust muffler in accordance with claim 1, wherein the at least one inlet pipe and the at least one outlet pipe or the at least one intermediate pipe are offset in relation to one another in a first offset direction essentially at right angles to the housing longitudinal axis and in a second offset direction that is essentially at right angles to the first offset direction essentially at right angles to the housing longitudinal axis.

7. An exhaust muffler in accordance with claim 1, wherein the housing jacket is configured with a cross-sectional housing profile flattened in a housing flattening direction, or the housing jacket comprises essentially planar side walls to be positioned essentially at right angles to a longitudinal direction of the vehicle or both the housing jacket is configured with a cross-sectional housing profile flattened in a housing flattening direction and the housing jacket comprises essentially planar side walls to be positioned essentially at right angles to a longitudinal direction of the vehicle.

8. An exhaust muffler in accordance with claim 6, wherein the flattening direction or the first offset direction or both the flattening direction and the first offset direction corresponds essentially to a longitudinal direction of the vehicle, or the second offset direction corresponds essentially to a vertical direction of the vehicle.

9. An exhaust muffler in accordance with claim 1, wherein the at least one inlet pipe or the at least one outlet pipe or both the at least one inlet pipe and the at least one outlet pipe has at least one pipe predetermined deformation area.

10. An exhaust muffler in accordance with claim 9, wherein the at least one pipe predetermined deformation area comprises a longitudinal area having a wave-shaped configuration or a bellows configuration or a longitudinal area configured with slots or a longitudinal area configured with an indentation or bulge or a longitudinal area configured with the flattened cross-sectional profile or a longitudinal area extending positioned at an angle in relation to a longitudinal direction of the vehicle.

11. An exhaust muffler in accordance with claim 9, wherein:

the at least one outlet pipe comprises a longitudinal area extending essentially in a direction of the housing longitudinal axis and a transition area to another longitudinal area extending essentially at right angles to the housing longitudinal axis; and the at least one pipe predetermined deformation area is provided in the transition area.

12. An exhaust muffler in accordance with claim 1, wherein:

the at least one outlet pipe comprises at least one longitudinal area extending essentially at right angles to the housing longitudinal axis outside the muffler housing; and a ratio of a cross-sectional dimension of the longitudinal area to a distance of the longitudinal area from the front wall, through which the outlet pipe passes, of the at least one outlet pipe, is in a range of 0.1 to 0.2.

13. An exhaust muffler in accordance with claim 1, further comprising at least one partition provided in the interior of the muffler, wherein the at least one inlet pipe or the at least one outlet pipe or at least one intermediate pipe passes through the at least one partition in an area of a pipe passage opening and either:

at least one opening, through which a pipe does not pass, is provided in the at least one partition; or the at least one pipe passage opening has an opening cross-sectional area that is larger than a cross-sectional area of the pipe passing through the at least one pipe passage opening; or at least one opening, through which a pipe does not pass, is provided in the at least one partition and the at least one pipe passage opening has an opening cross-sectional area that is larger than a cross-sectional area of the pipe passing through the at least one pipe passage opening.

14. An exhaust muffler in accordance with claim 13, wherein:

the at least one opening or the at least one pipe passage opening has a round cross-sectional geometry comprising an oval or elliptical cross-sectional geometry; or both the at least one opening and the at least one pipe passage opening have a round cross-sectional geometry comprising an oval or elliptical cross-sectional geometry.

15. An exhaust muffler in accordance with claim 13, wherein:

at least one slot defines a weakened area provided in the partition starting from at least one opening; or at least one slot defines a weakened area provided in the at least from one pipe passage opening; or the at least one slot defines a weakened area provided in the partition starting from at least one opening and the at least one slot defines a weakened area provided in the at least from one pipe passage opening.

16. An exhaust muffler in accordance with claim 15, wherein a deformation strap is provided by at least two weakened areas.

17. An exhaust muffler in accordance with claim 1, further comprising a support member extending at an angle in relation to the housing longitudinal axis, wherein the support member is connectable to a carrier structure and the muffler housing is supported in relation to the carrier structure by at least one support member.

18. An exhaust muffler in accordance with claim 17, further comprising at least one partition in the interior of the housing, wherein a distance of the at least one partition from a support area of the support member in relation to the muffler housing in the direction of the housing longitudinal axis is at least 50 mm.

19. An exhaust muffler in accordance with claim 1, wherein at least one front wall has at least one predetermined deformation area.

20. A motor vehicle comprising:
an exhaust muffler arranged in a rear area of the motor vehicle, the exhaust muffler comprising:
a muffler housing elongated in a direction of a housing longitudinal axis, the muffler housing comprising a housing jacket and two front walls, which are arranged at spaced locations from one another in the direction of the housing longitudinal axis and define an interior of the muffler with the housing jacket;
at least one inlet pipe leading into the interior of the muffler; and
at least one outlet pipe leading out of the interior of the muffler, the at least one inlet pipe or the at least one outlet pipe or both the at least one inlet pipe and the at least one outlet pipe and at least one intermediate pipe being configured with a cross-sectional profile flattened in a flattening direction, wherein the flattened cross-sectional profile is a round cross-sectional profile comprising an oval or elliptical cross-sectional profile or an essentially rectangular cross-sectional profile, wherein the housing longitudinal axis of the muffler housing is oriented essentially in a transverse direction of the vehicle.

21. An exhaust muffler for transverse installation in a vehicle, the exhaust muffler comprising:
a muffler housing elongated in a direction of a housing longitudinal axis, the muffler housing comprising a housing jacket and two front walls, which are arranged at spaced locations from one another in the direction of the housing longitudinal axis and define an interior of the muffler with the housing jacket;
at least one inlet pipe leading into the interior of the muffler; and
at least one outlet pipe leading out of the interior of the muffler, the at least one inlet pipe or the at least one outlet pipe or both the at least one inlet pipe and the at least one outlet pipe having at least one pipe predetermined deformation area, the at least one outlet pipe comprising a longitudinal area extending essentially in a direction of the housing longitudinal axis and a transition area to another longitudinal area extending essentially at right angles to the housing longitudinal axis, the at least one pipe predetermined deformation area being provided in the transition area.

22. An exhaust muffler for transverse installation in a vehicle, the exhaust muffler comprising:
a muffler housing elongated in a direction of a housing longitudinal axis, the muffler housing comprising a housing jacket and two front walls, which are arranged at spaced locations from one another in the direction of the housing longitudinal axis and define an interior of the muffler with the housing jacket;
at least one inlet pipe leading into the interior of the muffler;
at least one outlet pipe leading out of the interior of the muffler;
at least one partition provided in the interior of the muffler, wherein the at least one inlet pipe or the at least one outlet pipe or at least one intermediate pipe passes through the at least one partition in an area of a pipe passage opening and either:
at least one opening, through which a pipe does not pass, is provided in the at least one partition; or
the at least one pipe passage opening has an opening cross-sectional area that is larger than a cross-sectional area of the pipe passing through the at least one pipe passage opening; or
at least one opening, through which a pipe does not pass, is provided in the at least one partition and the at least one pipe passage opening has an opening cross-sectional area that is larger than a cross-sectional area of the pipe passing through the at least one pipe passage opening, wherein:
at least one slot defines a weakened area provided in the partition starting from at least one opening; or
at least one slot defines a weakened area provided in the at least one pipe passage opening; or
the at least one slot defines a weakened area provided in the partition starting from at least one opening and the at least one slot defines a weakened area provided in the at least one pipe passage opening.

* * * * *